May 5, 1942.  E. W. BÖRJESON  2,282,025
WHEEL SUSPENSION
Filed Nov. 18, 1938  2 Sheets-Sheet 2

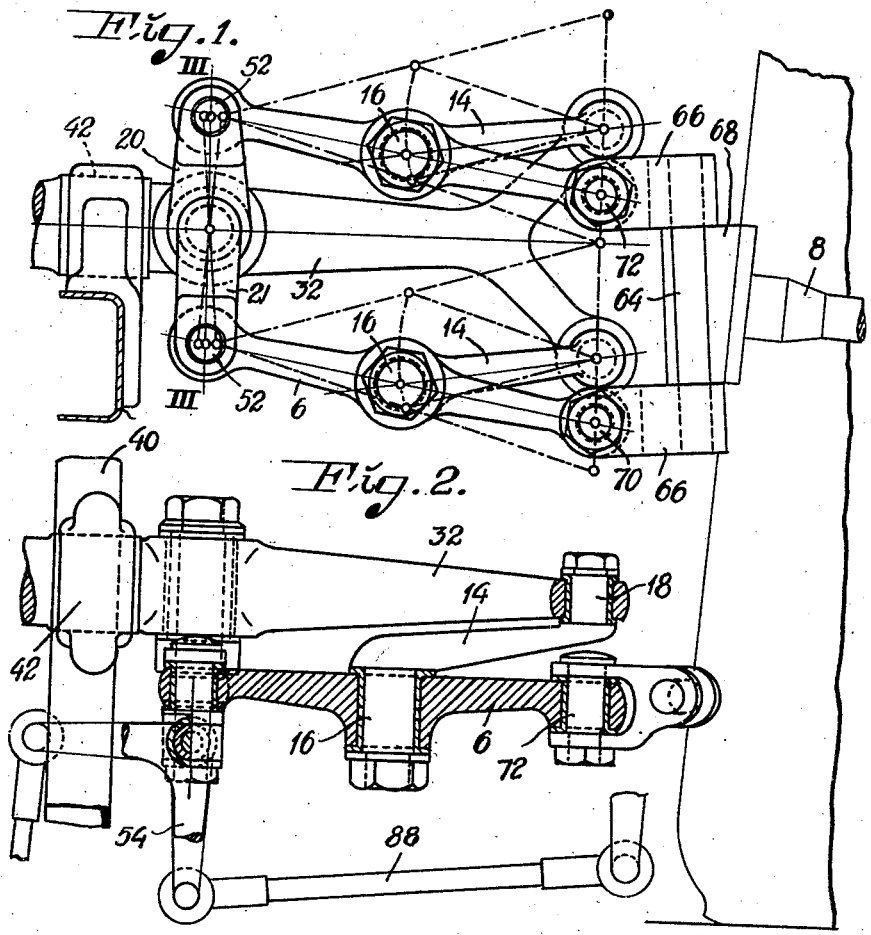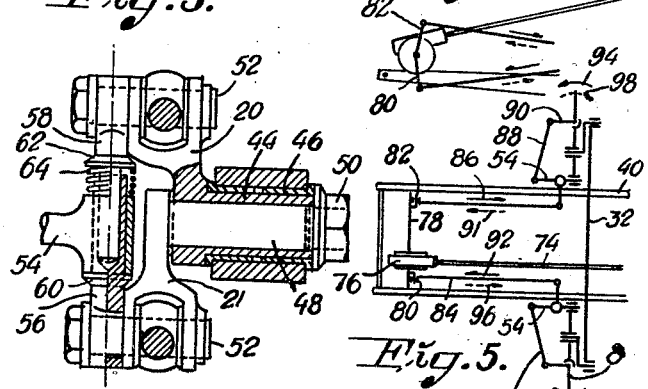

Inventor,
E. W. Börjeson
By: Glascock Downing & Seebold
Attorneys

Patented May 5, 1942

2,282,025

UNITED STATES PATENT OFFICE 2,282,025

WHEEL SUSPENSION

Edward William Börjeson, Stockholm, Sweden

Application November 18, 1938, Serial No. 241,287
In Sweden November 23, 1937

3 Claims. (Cl. 280—96.2)

REISSUED

My present invention relates to wheel suspensions and has for its main object to provide an improved mechanism for connecting the wheels of a vehicle to the vehicle frame so as to enable a wheel to act independently of its companion wheel, the wheels swinging each substantially in a vertical plane and maintaining the track unchanged.

Another object of my invention is to provide a simple construction of a lever system for a wheel suspension, said lever system being designed to enable the wheel to rise and fall independently in relation to the vehicle frame, maintaining the track of the wheels substantially unchanged.

A further object of my invention is to provide a pivotally mounted straight line travel wheel suspension for steerable road wheels in which the steering mechanism is substantially free from disturbance from the swinging movements thereof.

Other objects and advantages of my invention will be apparent from the following detailed description in which reference is had to the accompanying drawings, forming a part of this specification, and in which like reference characters designate like parts throughout the same:

Figure 1 is a front elevation of a constructional form of a mechanism for steerable road wheels, Figure 2 is a part sectional plan view of the mechanism shown in Figure 1, and Figure 3 is a part sectional detail view of part of the mechanism shown in Figures 1 and 2, the section being taken on line III—III of Figure 1.

Figures 4 and 5 are a side elevation and a plan view respectively of a steering lever mechanism in conjunction with a mechanism according to my invention.

Figure 6:
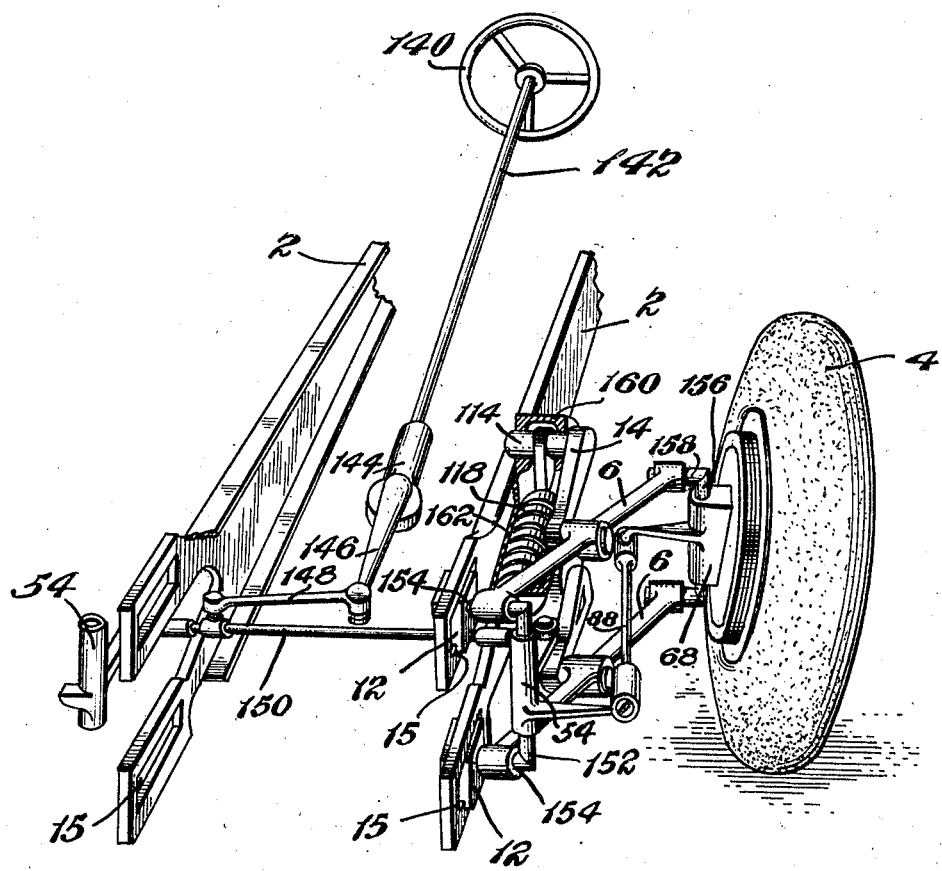
Figure 6 is a front perspective view of a suspension for a steerable road wheel, parts of the steering mechanism and the vehicle frame being shown.

In the constructional form of my invention shown in Figures 1 to 3 the cross bar 32 is secured to a frame member or beam 40 in the vehicle frame by clamping means 42 of any suitable construction. The outer end of the cross bar 32 is bifurcated and has journaled in the arms thereof the two links 14 which have their free ends formed as pivots 16 for the double-armed levers 6, the arms of each lever 6 being equal in length to each other and to the effective length of the links 14. The inner ends of the levers 6 are articulated to link supports 20, 21 which are pivoted to the cross bar 32.

Link supports 20, 21 are rotatable about a common axis, the upper link support 20 having integral therewith a hollow pin 44 fitted in a bearing sleeve 46 which is mounted in the frame bar 32. The lower link has a journal pin 48 extending through the hollow pin 44 and prevented from longitudinal displacement therein by a nut 50 screwed to the end thereof. As clearly shown in Figure 3, the ends of the levers 6 are journaled on bolts 52 extended transversely through the fork-shaped ends of the link supports. Bolts 52 are connected by means forming a pivot for a bell-crank lever 54 in a steering lever system. This means comprises an upstanding guide pin 56 pivoted on the lower bolt 52 and a guide pin 58 suspended on the upper bolt 52. The pin 58 is coaxial with pin 56 and slidable in an axial bore in the upper end thereof. Each pin has a shoulder 60 and 62 respectively, a coil spring 64 being compressed around the pins between the top of the bell-crank 54 carried by the pins 56, 58 and the shoulder 62 on pin 68. The lower side of bell-crank 54 is supported by shoulder 60.

The outer ends of the double-armed levers 6 are articulated to wheel carrying means comprising the steering spindle 64 and upper and lower connecting members 66 secured to the spindle and having fork-saped ends for the reception of the ends of levers 6, pivot pins 70, 72 extending therethrough. A steering knuckle 68 carries the stub axle 8.

As indicated by the dotted lines in Figure 1 the centres of the bolts 70, 72 will move on substantially a straight line when the wheel rises and falls. Furthermore, it will be clear from Figure 1 that the centre of bolts 52 move only through a small arc at a relatively appreciable swinging movement of the wheel, and consequently the deviation from the straight line of the centre of the bolt 52 is very small. At the swinging movements of the wheel the centres of the bolts 52 will move towards and from each other, such movement being possible due to the slidable or telescopic relation of the pins 56, 58.

The steering mechanism and levers for the wheel suspension lever system shown in Figures 1 to 3 may be of any suitable detail construction the principle thereof being illustrated by Figures 4 and 5. The hand-wheel spindle is designated by 74 and the steering worm by 76. The output shaft 78 of worm 76 has two bell-cranks 80, 82, one extending downwardly and the other upwardly in Figure 4. Steering rods 84, 86 connect the bell-cranks 80, 82 respectively with the bell-cranks 54 which are pivoted to the coaxial pins 56, 58 as described with reference to Figure 3. Rods 88 connect the other arm of the bell cranks 54 with the steering arm 90 on the steering knuckle 68. It is obvious that rotation of the spindle 74 in one direction will cause movements of the rods 84, 86 in the directions indicated by the arrows 92 shown in full lines the stub-axles 8 swinging as shown by the full lined arrows 94, and that rotation in the opposite direction of the spindle 74 will cause opposite movements of the rods and stub axles, or the movements shown by the dotted arrows 96, 98 respectively.

It will be noted that a particular advantage is involved in mounting the steering bell-crank lever 54 as shown. The lever 54 will in fact move exactly the same distance laterally as the centres of the pins 52 during the vertical swinging movements of the stub axle, and, therefore, the course of travel of the wheel will not be affected at rising and falling movements of the wheel provided that the steering rod 88 is parallel with the levers 6 in the projection on a vertical plane.

In Figure 6 a complete suspension for one front wheel 4 and the steering means therefor is illustrated. The longitudinal supporting frame member 2 for the companion wheel and a steering bell-crank lever therefor is also illustrated, and it will be evident that the companion wheel suspension is similar to that illustrated. Conventional hand wheel 40, steering spindle 142, worm gear 144, pitman arm 146, drag rod 148 and tie rod 150 may be used in the steering mechanism. The tie rod ends are each connected to one arm of the bell-crank lever 54 arranged to move together with the inner ends of the parallel levers 6 of the wheel suspension lever system similar to the construction shown in Figures 1 to 3. The other arm of the bell-crank lever 54 is connected by rod 88 to the arm of the steering knuckle 68.

The pivot for the bell-crank lever 54 is formed by the mid portion of a yoke 152 the shanks 154 being shaped as pivots for the inner ends of the double-armed levers 6 and having their inner ends journaled in the slide blocks 12 which are displaceable in guide ways 10 on the frame member 2. The mid portion of a yoke 156 parallel and similar to yoke 152 forms the steering spindle, and the shanks 158 of yoke 156 serve as pivot pins for the outer arms of the parallel levers 6. Links 14 are provided wherein the upper link 14 is shown with a bell crank 114 acting on a coil spring 118. Parts of a bearing bracket 160 and a spring housing 162 for the coil spring 118 are cut away for the purpose of illustration.

Although no suspension springs are shown in Figures 1 to 5 it will be evident to those skilled in the art that suspension springs of any conventional type may be used in all the various embodiments. The springs may be arranged and combined with the lever system as illustrated in Figure 6 or in other way.

Generally, it is understood, that as my invention is intended for use in various kinds of vehicles the elements shown in the drawings may have any of the well known equivalents substituted therefor, and that such changes as are necessary for adapting my invention to its various requirements without departing from the spirit of the invention may be made and fall within the scope of the appended claims.

What I claim is:

1. In a vehicle, a frame, a wheel, a wheel carrying member, means connecting said wheel carrying member to the frame for independent rising and falling movement of the wheel with respect to the frame comprising parallel double arm levers pivotally connected at one end to said wheel carrying member, parallel link levers each pivotally connecting intermediate portions of one of said double arm levers to the frame, pivots for the other ends of the double arm levers mounted on the frame for movement with respect thereto in substantially horizontal directions, a bell crank lever pivotally mounted adjacent said pivots for vertical movement, and a steering link connecting said bell crank lever to said wheel carrying member.

2. In a vehicle, a frame, a wheel, a wheel carrying member, means connecting said wheel carrying member to the frame for independent rising and falling movement of the wheel with respect to the frame comprising substantially parallel double arm levers connected at one end to said wheel carrying member, parallel link levers each pivotally connecting said double arm levers to the frame, link supports pivotally connecting the other ends of the double arm levers to the vehicle frame at a common point, slidable connecting means between the connecting point of said link supports forming a pivot, a bell crank lever carried by said pivot, and a steering link connected at one end to the bell crank lever and at the other end to the wheel carrying member.

3. In a vehicle, a frame, a wheel, a wheel carrying member, means connecting said wheel carrying member to the frame for independent rising and falling movement of the wheel with respect to the frame comprising parallel double arm levers pivotally connected at one end to said wheel carrying member, parallel link levers each pivotally connecting an intermediate portion of one double arm lever to the frame, pivots for the other ends of the double arm lever slidably mounted in said frame for movement in substantially horizontal directions, a vertical yoke connecting said pivots, a bell crank lever pivotally mounted on said yoke for vertical movements thereon, and a steering link connecting said bell crank lever to said wheel carrying member.

EDWARD WILLIAM BÖRJESON.